Nov. 1, 1955  G. E. SCHULTZ  2,722,244
BLADE CLAMP FOR RECIPROCATING SAW
Filed March 26, 1954  2 Sheets-Sheet 1
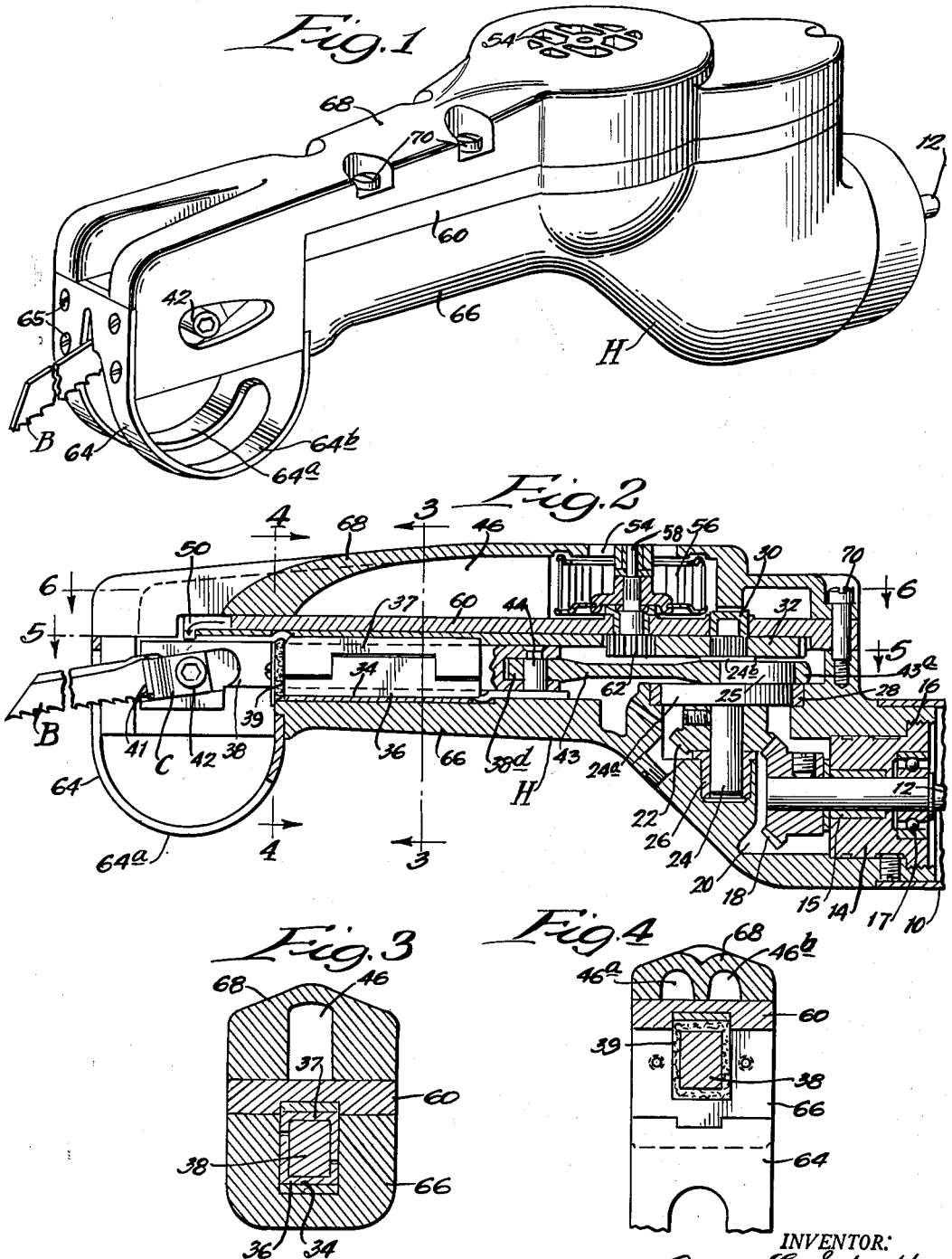
INVENTOR:
George E. Schultz,
BY
Dawson & Ooms,
ATTORNEYS.

Nov. 1, 1955 G. E. SCHULTZ 2,722,244
BLADE CLAMP FOR RECIPROCATING SAW
Filed March 26, 1954 2 Sheets-Sheet 2
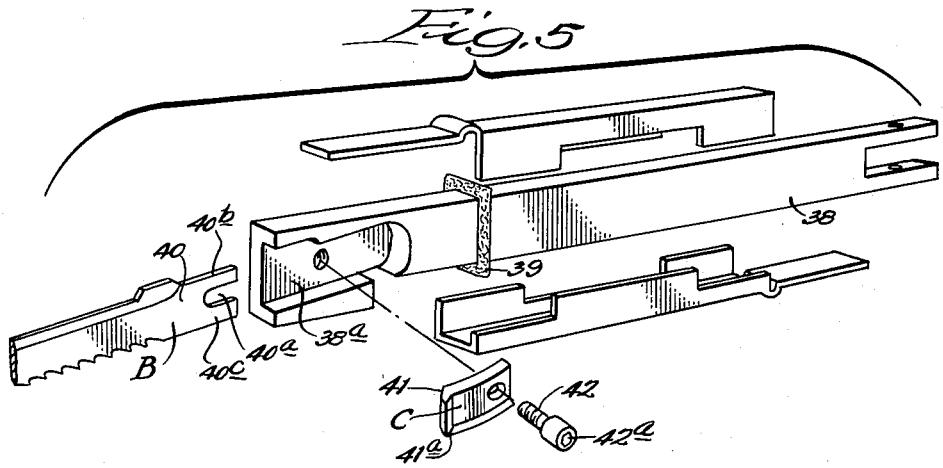
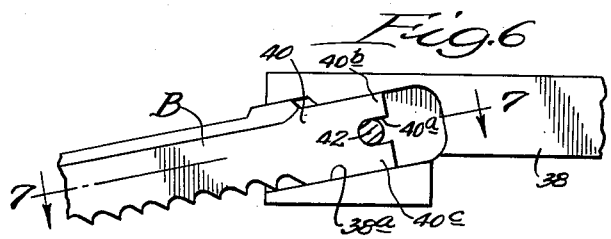
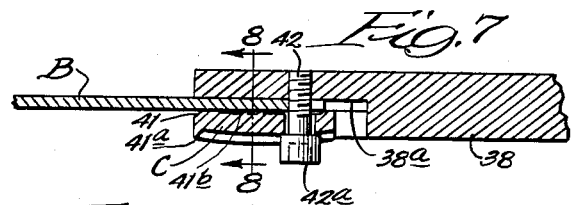
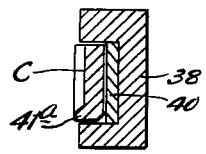
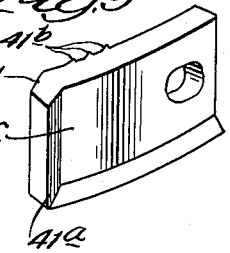
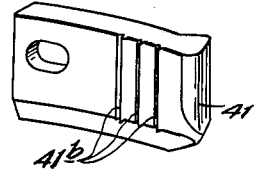
INVENTOR:
George E. Schultz,
BY
Ooms, McDougall, Williams & Hersh
ATTORNEYS.

United States Patent Office 2,722,244
Patented Nov. 1, 1955

2,722,244

BLADE CLAMP FOR RECIPROCATING SAW

George E. Schultz, Chicago, Ill., assignor to RCS Engineering Corporation, Joliet, Ill., a corporation of Illinois Application March 26, 1954, Serial No. 418,964

4 Claims. (Cl. 143—156)

This invention relates to an improvement of reciprocating saws which are attached to rotary tools, such as hand drills, and more particularly it relates to a novel means for securing a saw blade to the attachment. This application forms a continuation of my co-pending application, Serial No. 234,059 filed June 28, 1951, and formally abandoned as of April 27, 1954.

Attachments have been in use for some time to convert rotary tools to receive reciprocating saw blades and the like. However, these attachments have resulted in many problems including overheating and a tendency for the operating parts to become clogged with dust or chips produced by the sawing operation.

Another problem has been to find effective means to positively secure the saw blade to the attachment because of the extremely rough treatment given the blade during operation. Furthermore, it has been found that in the field blades are oftentimes inserted upside down. This reduces the efficiency of the device considerably. Applicant's novel means disclosed in this application have solved these problems.

The present attachment is cooled by an air stream adjacent the saw blade receiving piston. The stream of air is directed to the area adjacent the saw blade thereby blowing dust or chips away from the blade. This prevents the unit from becoming clogged with dust and chips and also enables the operator to view the work surface without the interference of any accumulated dust or chips resulting from the sawing operation. Moreover, the stream of air also cools the unit. These and other features are covered in United States Letters Patent No. 2,631,619.

The primary feature comprising this invention resides in an improved means for clamping a saw blade to the operative end of the attachment in an upright position. The improved means consists primarily of a novel arrangement of parts which insures the correct seating of the blade in the operative end of the attachment as well as to securely retain the blade to the attachment.

It is therefore a general object of the present invention to provide an improvement in reciprocating attachments for rotary tools.

Another object of the present invention is to provide an improved reciprocating attachment having means to positively seat the cutting saw blade and also prevent the saw blade from being inserted in an unconventional position.

Another object of this invention is to provide a clamping arrangement which will positively secure a saw blade to the operative end of the reciprocating saw tool attachment.

The novel features which I believe to be characteristic of my invention are set forth with particularity in the appended claims. My invention, both as to organization and method of operation, together with further objects and advantages thereof, can best be understood by reference to the following description taken in connection with the accompanying drawings in which:

Figure 1 is a perspective view of the reciprocating saw tool attachment;

Figure 2 is a side elevational view in cross section thereof;

Figure 3 is a cross-sectional view on line 3—3 of Figure 2;

Figure 4 is a cross-sectional view taken on line 4—4 of Figure 2;

Figure 5 is an exploded perspective view showing the reciprocating piston and the positive means for securing the saw blade.

Figure 6 is a side elevational view of the saw blade inserted in the reciprocating piston;

Figure 7 is a cross-sectional view taken on line 7—7 of Figure 6;

Figure 8 is a cross-sectional view taken on line 8—8 of Figure 7;

Figure 9 is a perspective view of one side of my new and improved clamp; and

Figure 10 is a perspective view of the other side of my new and improved clamp.

Referring to the figures, the housing structure of the tool attachment is indicated generally at H. This housing may be of any suitable material, such as cast aluminum. At the rear end of the housing a chuck guard 10 is found which is adapted to fit over the chuck of a rotary tool (not shown) such as a drill. This chuck guard acts as a safety feature in the event that the chuck becomes disengaged from the shaft 12 which is adapted to be received in the chuck of the drill (not shown) to receive rotations in accord with the rotations of the tool spindle.

The shaft 12 is enclosed by the bearing housing 14 which is mated to the housing H at 16 to prevent grease leakage and to aid in any gear adjustment which may be necessary. The shaft 12 is supported by the radial ball bearing 17 and a bronze bearing 15, both of which are contained in the bearing housing 14. The inward end of the shaft 12 terminates in a bevel gear 18 which fits in cavity 20 of the housing H. The bevel gear 18 meshes with the bevel gear 22 which is secured to the vertical shaft 24, which shaft is held in position by a sleeve bearing 26, insert block 28 and the blind end bearing 30. The blind end bearing 30 also prevents grease leakage.

Intermediate bearings 26 and 30, and adjacent the block 28, the shaft 24 enlarges at 24a to define a disk to support the eccentric pin or bearing 25. Above this pin the shaft 24 defines another enlarged concentric portion 24b which is adjacent to the spur gear 32.

At the front end of the housing H is defined a longitudinal cavity 34. The lower side of this cavity is lined with insert type bearings 36 and 37 which are interlockingly mated together as substantially shown in Figure 2. This eliminates the use of screws and the like and also provides an excellent grease seal and has the added advantage of being easily removable. The bearings 36 and 37 are of smooth configuration and adapted to receive the reciprocating saw receiving piston 38 with a minimum degree of friction.

The piston 38 is of rectangular cross-section and slidably fits in the housing H. A felt grease seal 39 is also provided at the forward part of the bearings 36 and 37 to prevent grease leakage.

The piston 38 at its forward end is provided with an irregular, downwardly slanting cut out portion 38a which is capable of receiving the shank 40 of a saw blade B having a cut out portion 40a intermediate the shank 40 of the end of the blade B. A portion 40b of the shank 40 which is above the cut out portion 40a is not as thick as that portion 40c of the shank 40 which is below the cut out section 40a. This insures that the blade B will only fit into the cut out portion 38a of the piston 38 right-side up.

As best shown in Figure 5 an irregular shaped clamp C which is constructed to conform to the cut out portion 38a of the piston 38 is also provided to help secure the saw blade B. To that end clamp C has a cut-away portion 41 which enables the blade B to readily be adapted between the side wall of the cut out portion 38a of the piston 38 and the clamp C and a relief portion 41a has been provided in the lower portion of the clamp C to clear the teeth on the blades B that have teeth on the full length of the blade. This will prevent any fracture in the hardened shank due to any compression of the set in the teeth. A screw 42 having a socket head 42a insures a positive retention of the saw blade B to the piston 38.

The face of the clamp C is provided with a plurality of raised sharp knurls 41b which are perpendicular to the plane of movement of the saw blade B. The knurls 41b dig into the shank 40, which is softer, of the saw blade B and thereby greatly increase the holding power of the clamp. The knurls 41b substantially lessen any "play" of the saw blade B when in operation which, of course, gives a cleaner cut.

Figures 6, 7 and 8 show the saw blade in a secured position to the cut out portion 38a of the piston 38. By using the clamp C together with the screw 42 a large gripping area is afforded the blade B in the cut out portion 38a of the piston 38. This is in contrast to the general use of a simple set screw or the like. The blade B is secured to the piston 38 by inserting the screw 42 through the opening in the clamp C and the cut out portion 40a of the blade B into the opening 38a of the piston 38 until all of the parts are drawn tightly together as shown in Figure 7.

As already pointed out the knurls 41b add to the holding power of the clamp because the raised sharp knurls bite into the softer part of the saw blade and they also prevent "play" of the blade when in operation.

It is to be noted that the saw blade B cannot be inserted upside down since the cut out portion 38a of the piston 38 is so slanted and the blade B is so constructed so as not to permit the inverted use of the blade since the parts, as described above, will not mate together unless the blade is inserted with the cutting edge downward. This is important because the reciprocating saw tool attachment works at its greatest efficiency when the operating portion of the blade is at a downward angle to the horizontal axis of the piston 38.

The piston 38 is connected at its rear end with the eccentric portion 25 of the shaft 24 so that the piston reciprocates in accord with the rotations imparted to the shaft. This connection is achieved by the connecting rod 43 which is received in slot 38d of the piston 38 and is pivotally connected thereto by the pin 44. At its opposite end 43a the connecting rod encircles the eccentric portion 25 to define a pitman and crank in conjunction therewith.

It will be apparent that when the shaft 12 is rotated by the rotary tool to cause shaft 24 to execute like rotations, the crank arm 43 imparts reciprocating movements to the piston 38.

The housing H is cooled adjacent the piston 38 and the blade B is kept free of chips or dust by a cooling air stream drawn into the longitudinal cavity or duct 46.

A plurality of openings 54 are formed in the top of the housing H adjacent the rear end of the duct 46. A fan 56, preferably of the Torrington rotor type, is mounted immediately below these openings and is received on shaft 58 which is supported by the web portion 60 of housing H which is formed by the cavity 46 and the track 34. The housing H defines a casing about fan 56 with a tangential outlet opening into the duct 46.

The gear 62 is formed on the end of shaft 58 opposite fan 56 and is in mating relation with the gear 32 so that the radius of gear 62 is much smaller than gear 32 so that the shaft 58 executes many rotations for each rotation of the shaft 24.

The housing H is formed by a lower part 66 and an upper part 68 held together by dowel type screws 70. These parts mate to define the housing and cavities therein.

When the shaft 12 is rotated to cause rotations of the shaft 24, reciprocating motions are imparted to the piston 38 and the saw blade B. At the same time rotations are imparted to the centrifugal fan 56. The latter rotations draw air into the duct 46 through the openings 54. The air so drawn in travels down the length of the duct 46 and is discharged on each side of the blade B through the air directing openings.

The saw is also provided with a rest or stand 64 at its front end. This rest is defined by straps 64a and 64b, one on each side of the blade B and joined together at both ends of the stand 64. At the forward ends the straps are anchored to the front end of the housing H by screws 65. At its rear end the stand 64 is anchored to the portion of the housing immediately under the end of the member 36 by the spring pressure of the stand 64. Intermediate its ends, the strap extends downwardly on opposite sides of the blade B and then curves backwardly in a semicircular shape to form a semicircular support for the housing H.

The rest or stand 64 protects the end portion of the piston 38 from the work or other objects that may reach that portion of the mechanism and become jammed therein. It further acts as a rest to hold the front portion of the tool at a predetermined spaced relation with the work. The operator can bear down on this rest to hold the tool securely against the work and achieve uniform spacing of the tip of the tool from the work. The semicircular configuration of the guard permits the tool to be rocked about the center of the circle thus defined without altering the distance between the tool and the work. The amount of sliding movement of the tool along the work is thereby minimized. Moreover, this curved shape may easily be moved over irregularities in the work.

While I have shown and described a specific embodiment of my invention it will, of course, be understood that I do not wish to be limited thereto and that by the appended claims I intend to cover all modifications and alternative constructions as fall within the true spirit and scope of my invention.

I claim:

1. A blade clamp for a reciprocating saw having a piston adapted for reciprocating movement, and a mounting face at the outer end of the piston, comprising a pair of parallel walls defining a mounting slot between them which opens to the mounting face at the end of the piston, a clamping member proportioned to fit within the slot at the mounting face, a plurality of teeth extending from the inner face of clamping member, said teeth being hardened sufficiently to cut into the shank of such saw blades as are intended for use on the saw, and means for removably securing the clamping member within the mounting slot in engagement with the saw blade shank.

2. A blade clamp and mating blade for a reciprocating saw having a piston adapted for reciprocating movement and a clamping face at the end of the piston comprising, in combination, an inclined wall perpendicular to the clamping face defining a clamping slot, an abutment comprising one inclined wall, a saw blade with a shank adapted to fit within the slot, a lug on the saw blade shank proportioned to key into the abutment in the mounting slot wall, a clamp having a clamping face proportioned to fit within the mounting slot, teeth on a clamping face hardened to bite into the softer shank of the blade, and means for removably engaging the clamp with the blade.

3. A blade clamp for a reciprocating saw having a piston adapted for reciprocating movement and a mounting face at the outer end of the piston comprising, in combination, inclined walls in the mounting face perpendicular to the plane of reciprocation of the piston, defining a mounting slot, a blade clamp proportioned to nest within the mounting slot, means removably engaging the clamp within the slot, and a plurality of hardened teeth on the inner face of the mounting clamp formed along axes inclined to the walls defining the mounting slot so that any effort to disengage a mounted blade will cause the blade shank to be wedgingly jammed against an inclined wall of the mounting slot.

4. A blade clamp and mating blade for a reciprocating saw having a piston adapted for reciprocating movement comprising, in combination, a clamping face on a vertical surface at the end of the piston, a clamp having a second clamping face proportioned to mate with the piston clamping face, an inclined wall perpendicular to the clamping faces thereby defining a mounting slot, an abutment perpendicular to the clamping faces, a saw blade with a shank adapted to fit within the mounting slot, a lug on the blade shank proportioned to key into the abutment, teeth on a clamping face hardened to bite into the softer shank of the blade, and means for removably engaging the clamp with the blade.

References Cited in the file of this patent

UNITED STATES PATENTS

| | | |
|---|---|---|
| 412,176 | Griffin | Oct. 1, 1889 |
| 1,826,188 | Pickering et al. | Oct. 6, 1931 |
| 2,072,298 | Fitzsimmons | Mar. 2, 1937 |
| 2,548,411 | Vache | Apr. 10, 1951 |
| 2,621,685 | Butz | Dec. 16, 1952 |
| 2,631,619 | Folli | Mar. 17, 1953 |
| 2,668,567 | Olson | Feb. 9, 1954 |